July 1, 1947.  F. P. LAWLER  2,423,193
OVERHEAD SHOVEL
Filed May 7, 1945  5 Sheets-Sheet 4

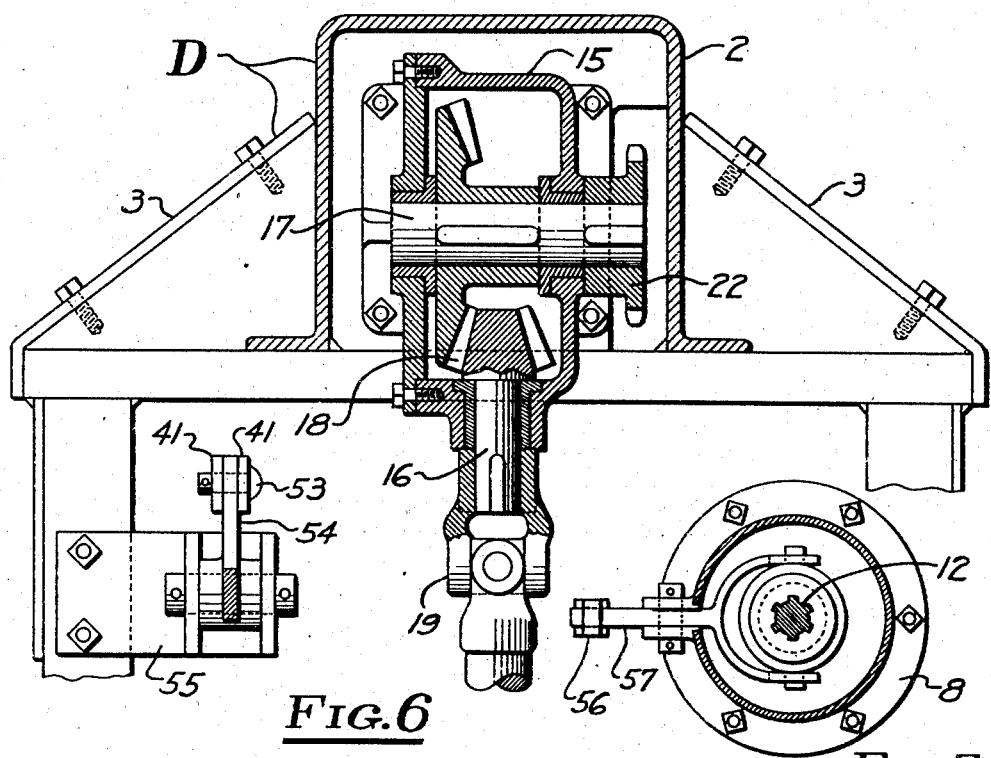
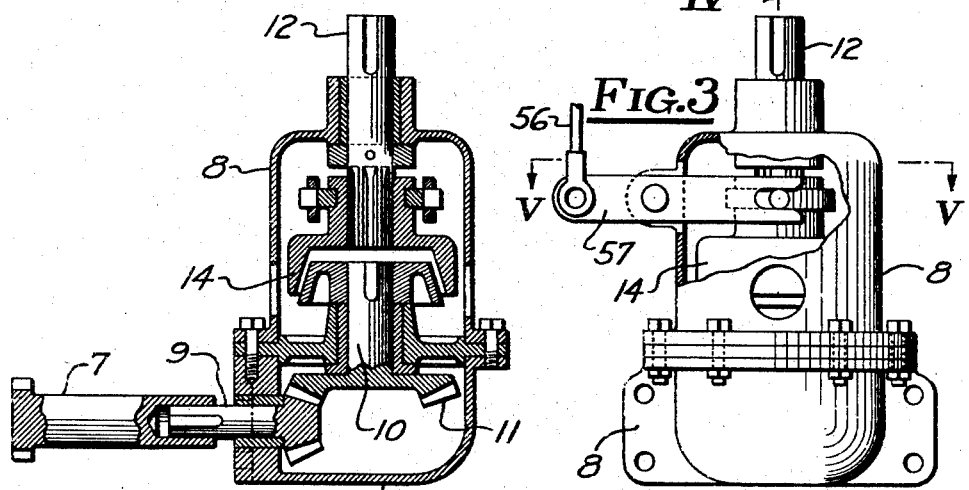

INVENTOR.
FRANK P. LAWLER
BY
Thomas Castberg
ATTORNEY

INVENTOR.
FRANK P. LAWLER
BY
Thomas Castberg
ATTORNEY

Patented July 1, 1947

2,423,193

UNITED STATES PATENT OFFICE 2,423,193

OVERHEAD SHOVEL

Frank P. Lawler, Chicago, Ill., assignor of one-third to Charles H. Grant, San Francisco, Calif., one-third to Frank P. Lawler, Chicago, Ill., and one-third to Paul J. Tyler, Oroville, Calif.

Application May 7, 1945, Serial No. 592,347

7 Claims. (Cl. 214—131)

This invention relates to an overhead shovel of the type disclosed in Patent No. 2,182,781, issued December 12, 1939, and especially to improvements on the structure disclosed in that patent.

In the above patent a tractor of the self-laying track type is shown upon which is pivotally mounted a pair of arms with a shovel secured between the outer ends. The arms together with the shovel are adapted to swing from a digging position at one end of the tractor through a vertical arc to a dumping position at the opposite end of the tractor. Power to operate the shovel is transmitted from a power takeoff shaft on the tractor to a hoist mounted in front of the radiator and power is applied from the hoist through a cable which extends to the shovel.

The position of the hoist forward of the radiator produces a very considerable overhang. It increases the length of the shovel arms and in general the overall length of the machine as a whole. It increases the number of sheaves required to guide the shovel cable and causes unnecessary bending of the cable in passing over the several sheaves thereby increasing wear and tear on the cable.

The object of the present invention is generally to improve and simplify the construction and operation of overhead shovels of the character described; to position the hoist at a point where it materially decreases the overhang and reduces the overall length of the machine as a whole; and more specifically, to position the hoist above the tractor substantially midway thereof where a cable of minimum length may be employed and where bending of the cable and the number of guide sheaves required may be materially reduced; to position the power transmitting clutch adjacent the power takeoff shaft so that the entire hoisting mechanism including the shovel will remain stationary and at rest except when the shovel is in operation also permitting the shovel or machine as a whole to be driven from one place to another while all of the shovel operating mechanism remains at rest; to provide a single control lever whereby both the power transmitting clutch and the brake on the hoist may be controlled in proper sequence when lifting or lowering the shovel; and further, to provide a shovel lifting and lowering mechanism whereby the lifting operation, when applied to a loaded shovel, starts slowly and then gradually increases or accelerates in speed and reaches a maximum as the shovel approaches a vertical position so as to provide momentum to carry the shovel over and beyond the vertical or dead center point.

The invention is shown by way of illustration in the accompanying drawings, in which:

Fig. 3 is a front elevation of the front power takeoff and clutch unit complete;

Fig. 4 is a vertical cross section on line IV—IV of Fig. 3;

Fig. 5 is a sectional plan view on line V—V of Fig. 3;

Fig. 6 is a sectional elevation on line VI—VI of Fig. 2;

Figure 1:
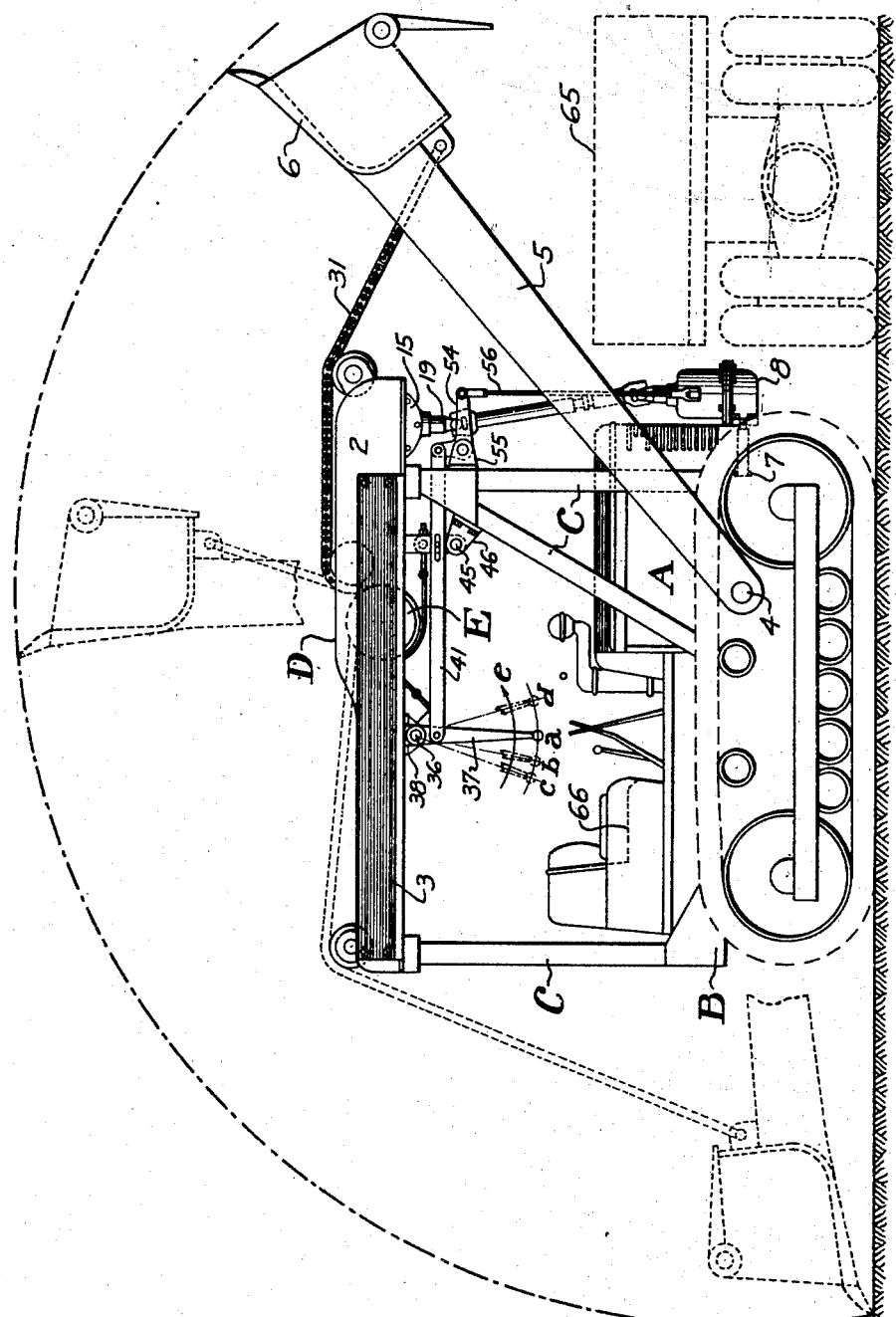
Fig. 1 is a side elevation showing the complete overhead shovel and its cycle of operation.

Referring to the drawings in detail, and particularly Fig. 1, A indicates a tractor of the self-laying track type, and suitably secured thereto is a sub-frame B which is provided with standards C supporting an overhead frame D consisting mainly of a channel-shaped section 2 and roof plates 3.

Pivotally mounted as at 4 is a pair of shovel arms 5 between the outer ends of which is secured a loading or excavating bucket or shovel 6.

Power to operate the shovel is transmitted from the tractor engine through a power takeoff shaft 7 disposed at the front end of the tractor. Secured to the tractor frame in front of the power takeoff shaft (see Figs. 1, 3, 4 and 5) is a housing 8 and journaled therein are shafts 9 and 10. The shaft 9 is splined or keyed to the power takeoff shaft 7 and is provided with a bevel pinion which meshes with a bevel gear 11 secured on shaft 10. A third shaft 12 is also journaled in the housing and splined and slidably mounted thereon is one member of a cone clutch, generally indicated at 14, the other member of said clutch being secured to the shaft 10. Suitably secured to the front end of the overhead frame D is a housing 15 (see Figs. 1, 2 and 6) and journaled therein are a pair of shafts 16 and 17 which are connected by a pair of bevel gears 18. Shafts 16 and 12 terminate in universal couplings 19 and 20 and these are connected by a splined telescoping shaft 21 so that when the clutch 14 is engaged, power will be transmitted to the shaft 17. This shaft carries a sprocket gear 22 and by means of a chain 23, power is transmitted to a hoist generally indicated at E.

This hoist is best illustrated in Figs. 2, 7, 8, 9 and 10. It comprises a shaft 25 secured crosswise of the overhead frame and upon this shaft is journaled three connected drums, to wit, a brake drum 26 with a surrounding and cooperating brake band 27, a main cable drum 28 and an auxiliary drum 29 on the end of which is secured a sprocket gear 30 to receive the driving chain 23.

Figure 9:
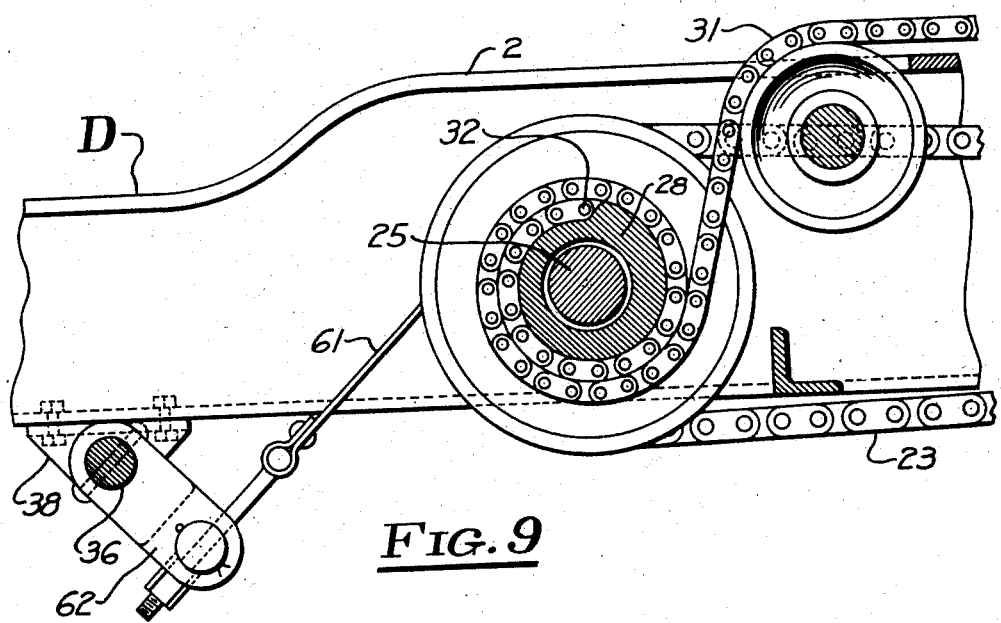
Fig. 9 is a sectional elevation on line IX—IX of Fig. 7.
Figure 10:
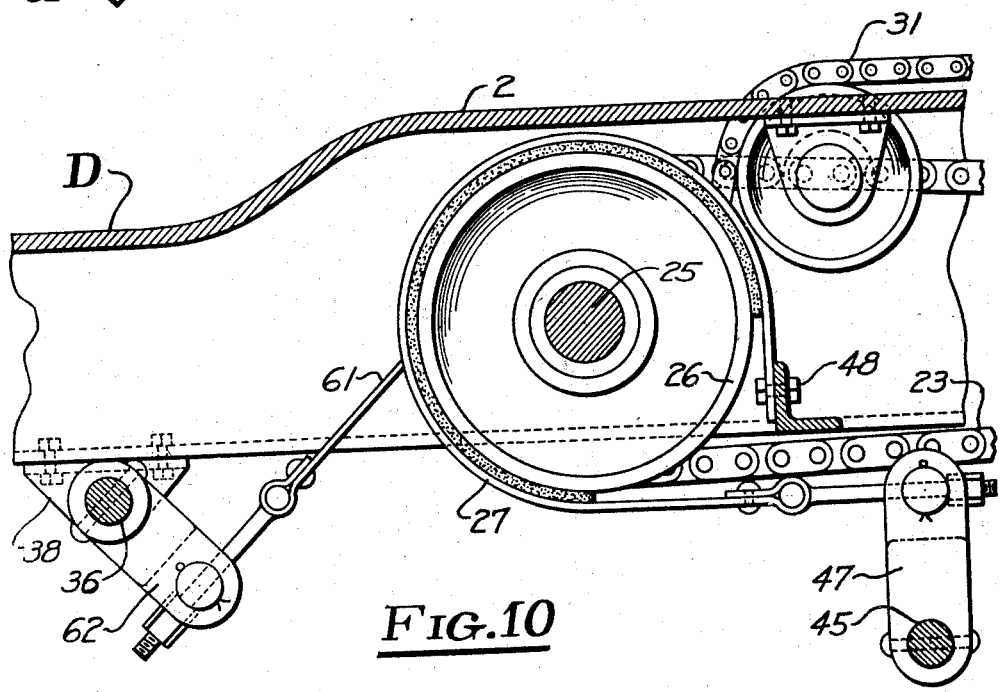
Fig. 10 is a sectional elevation on line X—X of Fig. 7.

The main drum 28 operates the shovel, and while a steel cable may be employed, a chain such as shown at 31 in Fig. 9 is preferred. The drum 28 has a width slightly greater than the chain. One end of the chain is anchored to the drum as at 32 (Fig. 9). Hence, when the drum is rotated, the chain becomes spirally wound about the drum. This is important as it imparts an accelerating movement to the shovel when it is moved from digging or loading position to a vertical position, that is the opposite end of the chain is attached to the shovel and when the drum is in operation, the shovel together with its arms will swing in a vertical arc about the pivot 4. The chain is practically unwrapped when the shovel is in digging position, hence when the drum rotates, the shovel starts with a slow lift, but the lift gradually increases in speed as it approaches vertical position. At this point, or just prior to reaching vertical position, clutch 14 is automatically thrown out or disengaged and the brake band is applied to the drum of the hoist but the momentum of the shovel is sufficient to carry it over the dead center of the vertical position to a point where it is leaning in the direction in which it is to be lowered to dump or unload the shovel. Due to the shovel leaning somewhat past dead center, the operator is then able to lower it by gravity simply by releasing the brake. When the shovel is dumped by means of the trip latch and cover described in the Patent No. 2,182,781 previously referred to, the shovel is then returned to the digging position by again engaging the clutch 14 and hoisting until the shovel is thrown past the vertical dead center in the opposite direction and then lowering it by releasing the brake, exactly in the same manner as described for the first half of the operating cycle. From this it will be apparent that the hoisting mechanism is arranged to hoist the shovel from either end of the machine and to literally "throw" the shovel past the vertical dead center. From this the benefit derived by having the hoisting cable or chain arranged to wind in a spiral on the cable drum as shown in Fig. 9, thus giving an accelerating lifting motion as the shovel approaches the vertical dead center from either side, will be appreciated. How the clutch 14 is automatically disengaged and the brake band 27 applied as the shovel approaches the vertical dead center from either side, will be referred to later in detail since this will be better understood after the arrangement of the control mechanism is described.

A cross shaft 36 (Figs. 2 and 7) carries and is attached to a control lever 37 and is supported in bearing brackets 38 attached to the channel-shaped section 2. Pivoted on control lever 37 at opposite sides of its fulcrum 36 are two sets of links 40 and 41. The links 40 are slotted at the opposite ends as at 42 and engage a pin 43 secured on a lever 44. The lever 44 is attached to shaft 45 which is fulcrumed in bracket 46. Also attached to shaft 45 is a lever 47 (see Fig. 10) to which one end of the brake band 27 is connected, the other end of the brake band being anchored to the overhead frame D as at 48. A tension spring 49 (see Fig. 2) is attached to lever 44 and anchored to the overhead frame D as at 50. The normal function of the spring 49 is to apply the brake band 27 on the brake drum 26 acting through lever 44, shaft 45 and lever 47. The second set of links indicated at 41 are also slotted as at 51 and engage a pin 52 secured on the lever 44. The other end of the link connects as at 53 with a bell crank 54 pivoted in a bracket 55. The opposite end of the bell crank carries a link 56 and this connects with a lever 57 (see Fig. 3) which engages or disengages the clutch 14.

Figure 2:
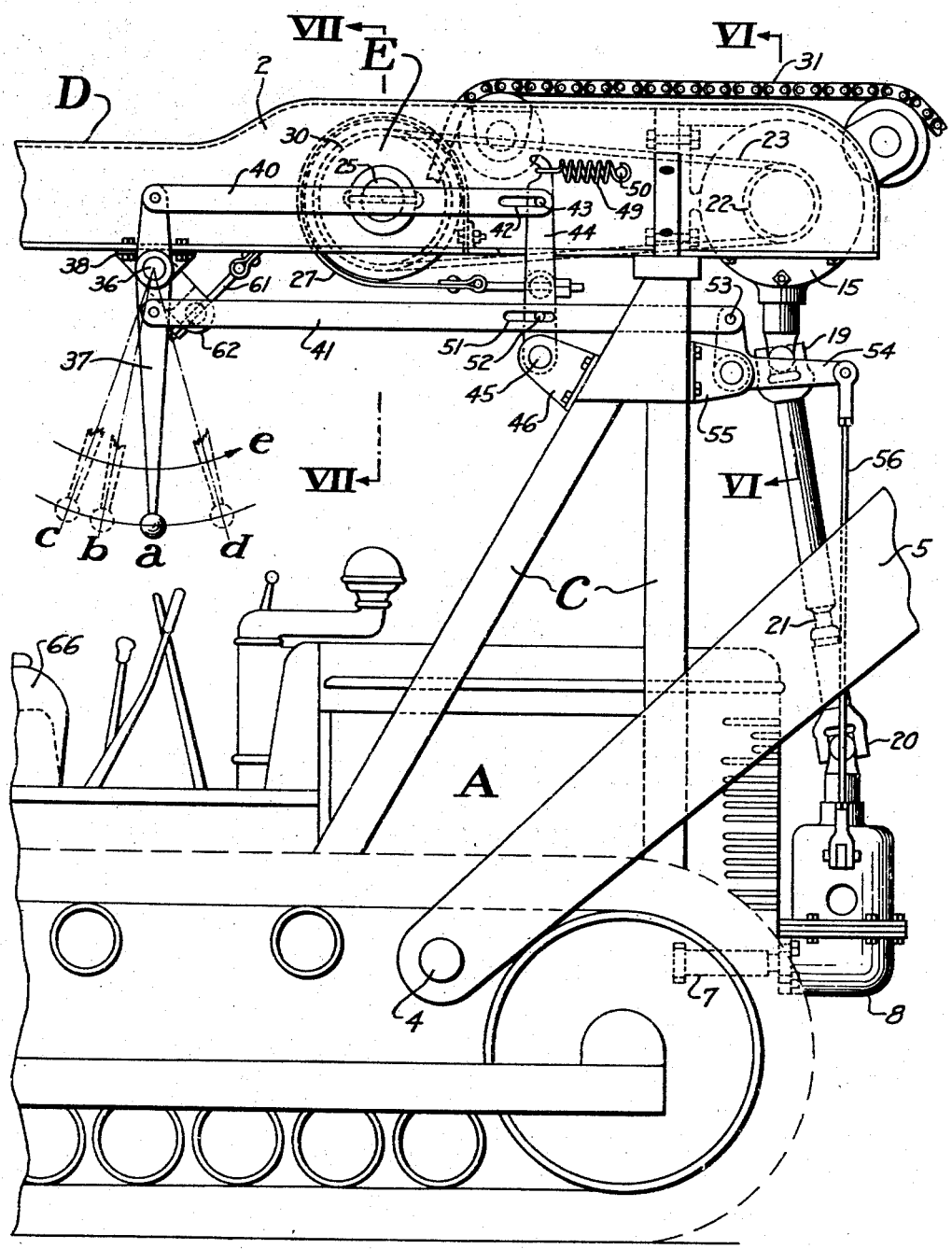
Fig. 2 is a partial side elevation similar to Fig. 1 enlarged to show the control mechanism.
Figure 7:
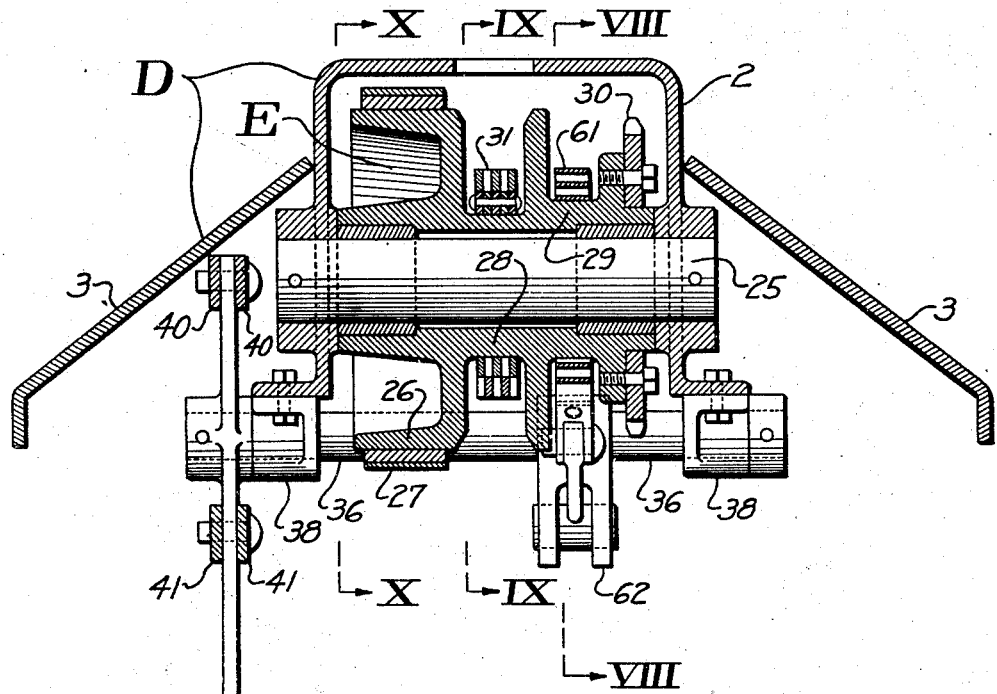
Fig. 7 is a sectional elevation on line VII—VII of Fig. 2.
Figure 8:
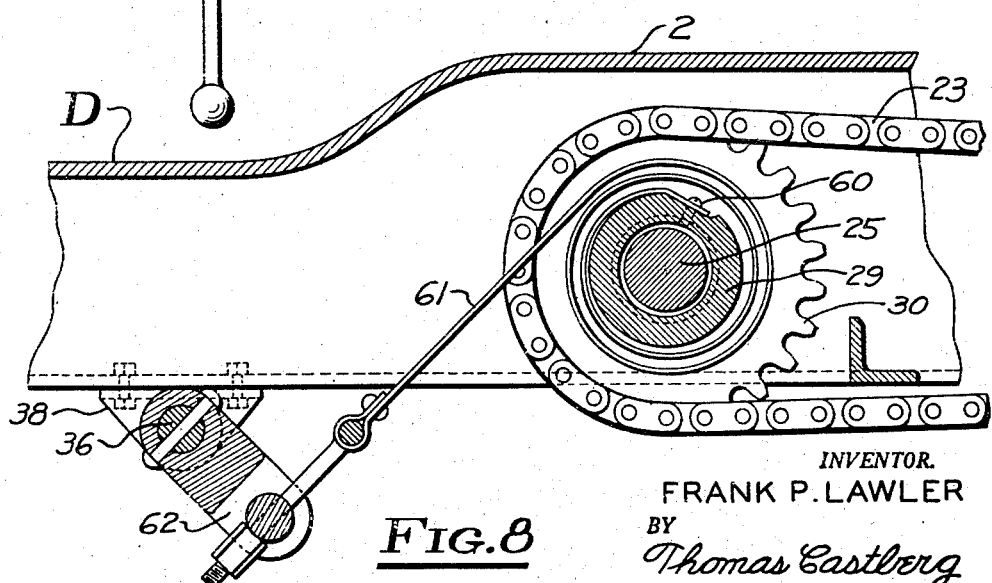
Fig. 8 is a sectional elevation on line VIII—VIII of Fig. 7.

The automatic release of the clutch 14 and the simultaneous application of the brake previously referred to will now be described. This is best illustrated in Figs. 2 and 8, the latter figure showing a section of the auxiliary drum 29. Anchored thereto as at 60 is a flexible belt or cable 61 which has a width substantially equal to that of the drum 29, hence when the drum rotates, the cable or belt will wrap spirally about it and when a certain number of wraps have been made, a pull will be exerted on a lever 62 which is secured on the cross shaft 36. This pull is exerted when the shovel approaches the vertical position from either side and since the cross shaft 36 is attached to the control lever 37, the pull acts to move the control lever 37 to the position a (Fig. 2) where the clutch 14 is automatically released and the brake applied. The shovel must then be lowered a certain distance which is sufficient to uncoil the tightly spiraled flexible belt or cable 61 before the control lever 37 can again be moved to the hoisting positions b and c.

In actual operation let it be assumed that the shovel is being used for the purpose of excavating gravel from a bank and depositing it in a truck such as indicated at 65. If that is the case, it is obvious that the driver or operator will occupy the seat indicated at 66 where all control levers are within handy reach. The first operation on the part of the driver will be to shift the gears of the tractor into reverse gear. He will then engage the engine clutch and the tractor will immediately move rearwardly and force the shovel into the gravel bank, thus filling it. The driver now disengages the tractor clutch and moves the gear shift lever to neutral or forward as required. The next operation on the part of the driver will be to transmit power from the power takeoff shaft to the hoist so as to raise the shovel and swing it to a dumping position. This is accomplished by grasping the lever 37 which normally assumes the neutral position indicated in full lines at a (Fig. 2). By pulling the lever towards himself, or to the position indicated by dotted lines at b, the main power transmitting clutch 14 is engaged as a pull will be transmitted through the link 41 causing the bell crank 54 to swing and pull the rod 56 upwardly, thereby engaging the clutch. A further pull on the lever to the position indicated at c causes the end of the slot 51 to engage the pin 52, thereby imparting movement to the lever 44 in a direction to release the brake. In other words there is a slight overlap between engagement of the power transmitting clutch and release of the brake as the control lever is pulled towards the hoisting position c.

As the power transmitting clutch is now engaged, and the brake released, power will be transmitted to the drum and the shovel will commence to lift or swing in an upward direction about the pivots 4 and as the cable, or rather the chain, wraps spirally upon itself about the hoisting drum, the speed of the lift accelerates, reaching its maximum as the shovel approaches a vertical position. This is desirable as the shovel should have sufficient momentum to carry it over and beyond vertical or dead center position. Just as the shovel approaches vertical position, belt 61 will have become wound about the auxiliary drum and a pull will thus be exerted on the lever 62, causing shaft 36 and a lever 37 to swing in direction of arrow e, the pull being sufficient to swing the lever 37 from the position c to the position a. In other words the power transmitting clutch is automatically released just as the shovel approaches vertical position and the momentum of the shovel at that time, due to the accelerating speed with which it is swinging, will be sufficient to carry it over and beyond vertical dead center position, and as there is an overlapping action by the release of the power transmitting clutch and application of the brake, the drum will come to rest and the shovel is held against further movement until released or lowered by the operator. With the shovel at rest in the position just beyond vertical position, the operator grasps the lever and pushes it towards the position indicated at d. In doing so, he exerts a pull on the link 40 and as the end of the slot 42 is in engagement with the pin 43, lever 44 will be pulled in a direction to neutralize the spring pressure on the brake band and the load or shovel may thus be lowered by brake action until it reaches dumping position. Here the brake is fully applied by returning the lever 37 to the position a. The operator then releases the shovel load into the truck and after release or discharge of the load, he again grasps the lever 37 and pulls it first to the position b and then to the position c. Power is again transmitted to the drum and the cycle will again be repeated, the only difference being that the direction of the swing of the shovel is reversed.

From the foregoing description it should be obvious that the change of position of the hoisting drum from a point forward of the radiator to the overhead position here shown simplifies the structure as a whole. First of all it materially decreases the overhang as the only mechanism now disposed in front of the radiator is the housing 8 containing the power transmitting clutch 14 and the bevel gear drive heretofore described. This requires comparatively small space and may be bolted directly to the forward end of the tractor. From here the power is transmitted through the telescoping vertical shaft to the bevel gears 18 carried by the overhead frame, and by the chain 23 power is transmitted from the shaft 7 to the hoisting drum. This arrangement of power transmission materially reduces the overhang previously referred to and it reduces the overall length of the machine as a whole as the arms supporting the bucket may be shortened and the height of the overhead frame may be reduced. Furthermore, it decreases the length of the lifting cable or hoisting chain and it reduces the number of guide sheaves required in conjunction therewith. Similarly it materially reduces bending action of the cable or chain and therefore wear and tear. Again by arranging the clutch 14 at the point described, that is adjacent the power takeoff shaft, it becomes possible to maintain the hoist and shovel mechanism in a condition of rest, for instance when moving the tractor from place to place, and in fact at all times except when the shovel is in actual operation, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, an intermediate transmission drive supported by the frame, a driving connection between said intermediate transmission and the hoisting drum, a cable anchored at one end to said drum and at the other end to the shovel, clutch actuated means for transmitting power from the tractor to the intermediate transmission to rotate the drum so as to swing the shovel from either end of the tractor to a substantially vertical position, brake actuated means cooperating with the drum to lower the shovel from a substantially vertical position towards either end of the tractor, and automatically actuated means for disengaging the power transmitting clutch as the shovel approaches vertical position and for applying the brake to stop movement of the shovel at a predetermined point beyond vertical position.

2. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, an intermediate transmission drive supported by the frame, a driving connection between said intermediate transmission and the hoisting drum, a cable anchored at one end to said drum and at the other end to the shovel, clutch actuated means for transmitting power from the tractor to the intermediate transmission to rotate the drum so as to swing the shovel from either end of the tractor to a substantially vertical position, brake actuated means cooperating with the drum to lower the shovel from a substantially vertical position towards either end of the tractor, automatically actuated means for disengaging the power transmitting clutch as the shovel approaches vertical position and for applying the brake to stop movement of the shovel at a predetermined point beyond vertical position, and a manually actuated lever for controlling the brake to lower the shovel from a substantially vertical position towards either end of the tractor.

3. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, an intermediate transmission drive supported by the frame, a driving connection between said intermediate transmission and the hoisting drum, a cable anchored at one end to said drum and at the other end to the shovel, clutch actuated means for transmitting power from the tractor to the intermediate transmission to rotate the drum so as to swing the shovel from either end of the tractor to a substantially vertical position, brake actuated means cooperating with the drum to lower the shovel from a substantially vertical position towards either end of the tractor, a manually actuated lever for selectively engaging or disengaging the power transmitting clutch and for controlling release or application of the brake, and means for automatically actuating said lever to disengage the clutch as the shovel approaches vertical position and for applying the brake to stop movement of the shovel at a predetermined point beyond vertical position.

4. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, an intermediate transmission drive supported by the frame, a driving connection between said intermediate transmission and the hoisting drum, a cable wound about said drum and extending to and secured to the shovel, clutch actuated means for transmitting power to the intermediate transmission to drive the drum so as to raise and swing the shovel from a position at either end of the tractor to a substantially vertical position above the tractor, a brake cooperating with the drum, and means actuated by rotation of the drum for automatically disengaging the clutch as the shovel approaches vertical position and for applying the brake to stop movement of the shovel at a predetermined point beyond vertical position.

5. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, a cable anchored at one end to said drum and at the other end to the shovel, clutch actuated means for transmitting power from the tractor to rotate the drum so as to swing the shovel from either end of the tractor to a substantially vertical position, brake actuated means cooperating with the drum to lower the shovel from a substantially vertical position towards either end of the tractor, automatically actuated means for disengaging the power transmitting clutch as the shovel approaches vertical position and for applying the brake to stop movement of the shovel at a predetermined point beyond vertical position, said means comprising a lever pivoted on the overhead frame, a flexible member secured at one end to said lever and at the opposite end to a drum rotatable in unison with a hoisting drum, said flexible member being wound about its drum and exerting a pull on the lever to swing the lever about its pivot when the hoisting drum has made a predetermined number of revolutions, and means actuated by swinging movement of said lever for disengaging the clutch and for applying the brake.

6. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, a cable anchored at one end to said drum and at the other end to the shovel, clutch actuated means for transmitting power from the tractor to rotate the drum so as to swing the shovel from either end of the tractor to a substantially vertical position, brake actuated means cooperating with the drum to lower the shovel from a substantially vertical position towards either end of the tractor, automatically actuated means for disengaging the power transmitting clutch as the shovel approaches vertical position and for applying the brake to stop movement of the shovel at a predetermined point beyond vertical position, said means comprising a lever pivoted on the overhead frame, a flexible member secured at one end to said lever and at the opposite end to a drum rotatable in unison with a hoisting drum, said flexible member being wound about its drum and exerting a pull on the lever to swing the lever about its pivot when the hoisting drum has made a predetermined number of revolutions, a pair of link bars, means whereby swinging movement of the lever is transmitted to impart longitudinal movement to said link bars, and means actuated by said longitudinal movement of the link bars for disengaging the clutch and for applying the brake.

7. In combination with a tractor of the character described, a pair of arms pivoted adjacent the sides of the tractor, a shovel secured to said arms at the outer ends thereof, said arms being of a length so as to swing the shovel through a vertical arc parallel to the longitudinal axis of the tractor from a digging position at one end to a dumping position at the opposite end of the tractor, an overhead frame supported by the tractor, a hoisting drum supported by said frame at a point substantially in vertical alignment with the pivot about which the shovel arms swing, a cable anchored at one end to said drum and at the other end to the shovel, clutch actuated means for transmitting power from the tractor to rotate the drum so as to swing the shovel from either end of the tractor to a substantially vertical position, brake actuated means cooperating with the drum to lower the shovel from a substantially vertical position towards either end of the tractor, automatically actuated means for disengaging the power transmitting clutch as the shovel approaches vertical position and for applying the brake to stop movement of the shovel at a predetermined point beyond vertical position, said means comprising a lever pivoted on the overhead frame, a flexible member secured at one end to said lever and at the opposite end to a drum rotatable in unison with a hoisting drum, said flexible member being wound about its drum and exerting a pull on the lever to swing the lever about its pivot when the hoisting drum has made a predetermined number of revolutions, a pair of link bars, means whereby swinging movement of the lever is transmitted to impart longitudinal movement to said link bars, means actuated by said longitudinal movement of the link bars for disengaging the clutch and for applying the brake, and manually controlled means for imparting longitudinal movement to the link bars to engage or disengage the clutch and brake.

FRANK P. LAWLER.

REFERENCES CITED

The following references are of record in the file of this patent:

UNITED STATES PATENTS

| Number | Name | Date |
| --- | --- | --- |
| 1,307,448 | Lerch | June 24, 1919 |
| 1,473,815 | Francke | Nov. 13, 1923 |
| 1,506,762 | Manierre | Sept. 2, 1924 |
| 2,182,781 | Andersen et al. | Dec. 12, 1939 |
| 2,227,624 | Benbow et al. | Jan. 7, 1941 |
| 2,316,760 | Andersen et al. | Apr. 20, 1943 |
| 2,377,495 | Hofmeister | June 5, 1945 |